March 19, 1940.　　　C. J. CRANE ET AL　　　2,194,217
NAVIGATIONAL CONTROL MEANS
Filed March 10, 1938
FIG.1.
FIG.2.
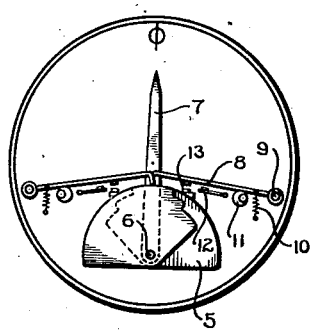
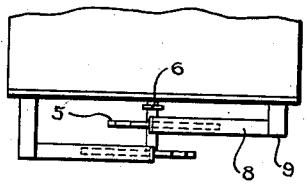
FIG.3.
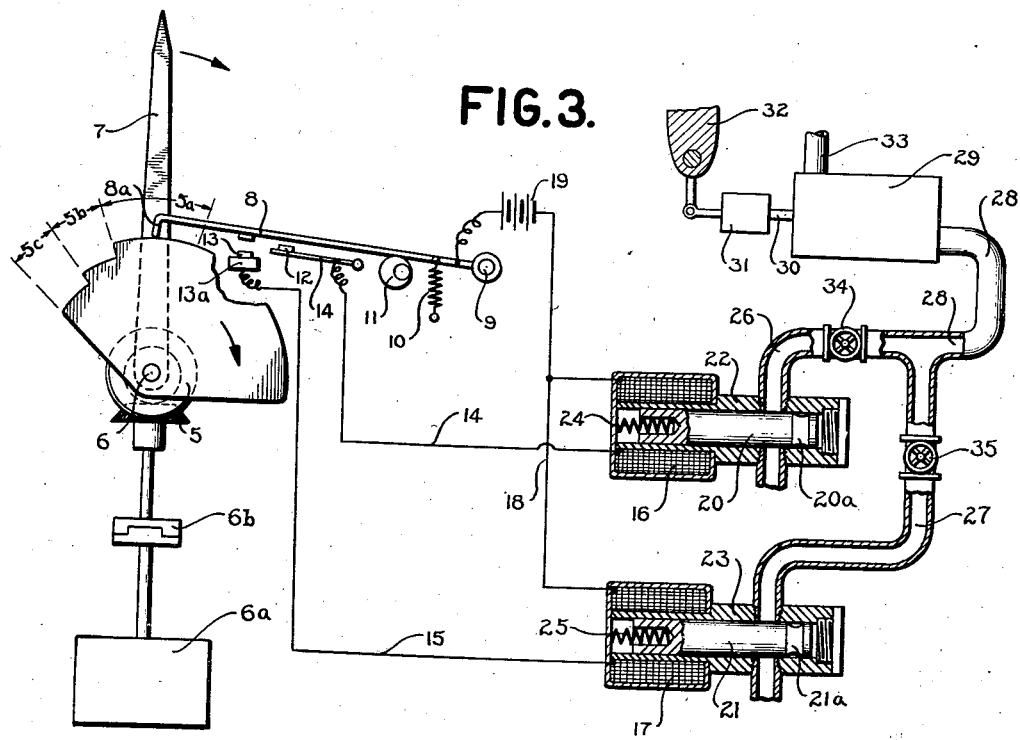
INVENTORS
CARL J. CRANE
RAYMOND K. STOUT
BY
ATTORNEYS Patented Mar. 19, 1940

2,194,217

UNITED STATES PATENT OFFICE 2,194,217

NAVIGATIONAL CONTROL MEANS

Carl J. Crane and Raymond K. Stout, Dayton, Ohio

Application March 10, 1938, Serial No. 195,174

2 Claims. (Cl. 114—144)

This invention relates to relay apparatus and more particularly to automatic relay apparatus for use in navigational control means.

One of the objects of the present invention is to provide novel means for amplifying the minute torque produced by sensitive indicating instruments.

Another object of this invention is to provide novel means for amplifying the indications of a turn-indicator or a compass for steering vehicles such as aircraft.

A further object is to provide novel steering apparatus adapted for cooperation with a direction indicator.

An additional object is to provide novel automatic pilot relay apparatus which is capable of controlling the speed with which vehicle course changes are made.

Another object is to provide novel means for holding a vehicle, as an aircraft, upon a predetermined course.

A further object is to provide course control means for aircraft wherein the control surfaces are displaced at a speed responsive to the amount of the course deviation.

A further object is to provide novel means for controlling a servo-motor wherein a flow adjustment of the pressure agent employed therewith is provided.

The above and further objects and novel features of the invention will more fully appear from the following detailed description when the same is read in connection with the accompanying drawing. It is to be expressly understood, however, that the drawing is for the purpose of illustration only and is not intended to define the limits of the invention, reference being had for this latter purpose to the appended claims.

In the drawing, wherein like reference characters refer to like parts throughout the several views, Fig. 1 is a front elevation of one embodiment of the cam and follower means employed in the present invention mounted upon a suitable instrument;

Fig. 2 is a top elevation of the parts shown in Fig. 1; and,

Fig. 3 is a schematic diagram of one embodiment of the invention showing the portion thereof adapted for amplifying a torque acting in a clockwise direction.

The form of the invention illustrated in the accompanying drawing, by way of example, is a device for automatically holding a vehicle such as an aircraft or a boat upon a predetermined course by controlling the rudder or suitable control surfaces thereof, to compensate for course changes in accordance with the movements of a compass, turn indicator or other instrument adapted for indicating a change of vehicle attitude. The device comprises attitude responsive cam means which control suitable servo-motor means which, in turn, govern vehicle control surfaces.

In the form illustrated, novel means are provided for compensating for the deviation of a vehicle from a predetermined course. The apparatus for compensating for deviation to the left is similar in construction but oppositely disposed relative to the apparatus for compensating for right deviation. A portion of the apparatus for both left and right deviation is shown in Figs. 1 and 2. In Fig. 3 is illustrated the mechanism for compensating for a left deviation only.

As shown, the novel mechanism comprises a cam 5 mounted upon a shaft 6 and adapted for angular displacement therewith. Shaft 6, in the form shown, is operatively connected to a direction indicator as a radio compass 6a through a clutch 6b and is provided with a suitable pointer 7 which is drivably connected thereto. Cam 5 comprises a portion shaped in the form of a sector of a circle having sections of different radii. The peripheries of these sections, in the embodiment illustrated, as 5a, 5b and 5c, constitute the contours which are to be followed by an arm 8 constituting a cam follower which is pivotally mounted upon a pin 9. The radii of sections 5a, 5b and 5c progressively decrease in length in the order named.

Follower 8 constitutes an electrical conductor and pivot pin 9 is electrically insulated from the mounting therefor. A downwardly extending finger 8a is provided at the free extremity of follower 8 which contacts the periphery of cam 5, said follower being resiliently urged against said periphery by a spring 10 which is attached to the follower, for example, adjacent the pivoted end thereof.

In order for follower 8 to move freely from one cam sector to another, the same is oscillated by a rotating member 11 drivably connected to suitable rotating means (not shown). The arc of oscillation of arm 8 is thus controlled by cam 5.

Novel means are provided for controlling the operation and speed of servo-motor means in accordance with the aforesaid arc of oscillation, comprising in the form shown two contacts 12 and 13 adjacent arm 8, the first of which, for a purpose to be explained later, is resiliently mounted upon a spring arm 14 and is situated so as to be engaged by arm 8 before contact 13, which, in turn, is carried by a fixed mounting 13a. Contacts 12 and 13 are in circuit through leads 14 and 15 with solenoids 16 and 17, respectively, which latter by a lead 18 are connected to arm 8 through an energy source 19.

Suitable plungers 20 and 21 are provided for solenoids 16 and 17, respectively, which plungers constitute, in the embodiment shown, piston valves for the control of said servo-motor. Said valves are provided with peripheral grooves 20a and 21a, the former of which is smaller than the latter, thus the pressure agent flow permitted by the former will be less than the flow permitted by the latter, and as the valves are successively opened the servo-motor speed will increase. Valves 20 and 21 move within cylindrical housing 22 and 23, respectively, and are normally held in a closed position by springs 24 and 25. Valves 20 and 21 govern the flow of a pressure agent in conduits 26 and 27, respectively, which conduits are in communication from a common pressure agent source (not shown) with a common conduit 28. Conduit 28, in turn, is connected to a servo-motor 29 having a piston rod 30 which, through a suitable clutch 31 governs the angular positions of a control surface as a rudder 32. Motor 29 is in communication by means of a conduit 33 with the apparatus (not shown) which is responsive to course deviations to the right. Adjusting valve 34 and 35 are provided in conduits 26 and 27, respectively, to refine the flow adjustment of the pressure agent.

In operation, considering only the portion of the apparatus for correcting for a course deviation to the left, as shown in Fig. 3, clutch 6b is disengaged and the craft is manually adjusted to a predetermined course. Cam 6 is centralized relative to follower 8, and clutches 6b and 31 are engaged. Thus, shaft 6 is operatively connected to the direction indicator and motor 29 is in driving connection with rudder 32. The driving member 11 cooperating with spring 10 which urges arm 8 in a counter-clockwise direction, causes said arm to oscillate about pin 9 and to periodically engage the periphery of cam 5. When upon the correct course, finger 8a engages portion 5a of cam 5. This portion has a radius of sufficient length to restrict the arc of oscillation and to prevent arm 8 from engaging either contact 12 or 13. If a course deviation to the left occurs cam 5 and pointer 7 will move together in the direction of the arrows until the finger 8a periodically engages surface 5b. Arm 8 is now permitted to oscillate in an arc of sufficient size to allow said arm to engage contact 12 which will periodically energize solenoid 16 and will withdraw piston valve 20 against the pressure of spring 24 to open said valve and permit the pressure agent to flow slowly to motor 29 through small groove 20a and conduit 26. Motor 29 thus will slowly move rudder 32 to the right in compensation for the course deviation. If the course deviation is sufficient in amount to displace cam 5 still further, the finger 8a will engage section 5c. The arc of oscillation of arm 8 consequently will be larger than before and said arm will engage contact 12 which will be thrust downwardly against the pressure of spring 14 and will permit the arm to next engage contact 13. Solenoid 17 will then be energized, piston valve 21 will be withdrawn from the closed position against the pressure of spring 25 and will open said valve to permit a rapid flow of the pressure agent to motor 29 through large groove 21a and conduit 27. There is thus a periodic successive energizing of both solenoids which will cause a rapid movement of motor 29 and hence a rapid displacing of surface 32. When the craft, under the influence of the displaced control surface, begins to regain the original course, the cam 5 will reverse its direction of motion. During the process of regaining said course, follower 8 will pass from section 5c to 5b to 5a. Upon regaining section 5a the solenoids 16, 17 will be deenergized and valves 20, 21 will have been thrust to the closed position by springs 24, 25, respectively.

There is thus provided a novel servo-motor control device which may be used in cooperation with a direction indicator as an automatic pilot relay for aircraft. The speed of operation is adjustable and may be controlled in accordance with the desires of the operator. It is simple in construction, light in weight and well adapted for use in aircraft.

Although only one embodiment of the invention is illustrated and described in detail, it is to be expressly understood that the same is not limited thereto. For example, in the form illustrated, only two valves are shown; however, any suitable number of valves may be employed in the structure with as many speeds for governing the servo-motor. Also, in the form shown, the device is adapted for controlling a fluid actuated servo-motor; however, an electric servo-motor may be substituted for this. Furthermore, in the embodiment illustrated, the apparatus is adapted for controlling the course of a vehicle by amplifying the indications of a direction indicator; however, the device may be used to amplify the minute torque of any sensitive instrument for any purpose. Various changes may be made in the design and arrangement of the parts illustrated without departing from the spirit and scope of the invention as the same will now be understood by those skilled in the art. For a definition of the limits of the invention, reference will be had primarily to the appended claims.

What is claimed is:

1. In apparatus of the class described, a radio compass having a right-left indicator, a right cam and a left cam operatively connected to said indicator and movable therewith, pneumatic means controlled in accordance with the movement of said cams, and means for controlling said pneumatic means including an oscillatable follower arm, contacts controlled by said arm, and one or more solenoid valves operatively connected to said contacts.

2. In combination with a pneumatic servo-motor adapted to operate a vehicle control surface, power supply conduits for said servo-motor, high and low speed solenoid valves for controlling said conduits, and means for controlling said valves comprising a radio compass having a right-left indicator, a pair of cams movable by said indicator, an arm engaging each of said cams, means for oscillating said arms, and a pair of circuits controlled by said arms and operatively connected to said solenoid valves.

CARL J. CRANE.
RAYMOND K. STOUT.